(12) United States Patent  
McCallister

(10) Patent No.: US 10,088,080 B2  
(45) Date of Patent: Oct. 2, 2018

(54) COLLAPSE RESISTANT HOSE AND THE MANUFACTURE OF THE SAME

(71) Applicant: Eaton Intelligent Power Limited, Dublin (IE)

(72) Inventor: Ian Christopher McCallister, Toledo, OH (US)

(73) Assignee: Eaton Intelligent Power Limited (IL)

( * ) Notice: Subject to any disclaimer, the term of this patent is extended or adjusted under 35 U.S.C. 154(b) by 74 days.

(21) Appl. No.: 15/036,736

(22) PCT Filed: Nov. 7, 2014

(86) PCT No.: PCT/US2014/064640  
§ 371 (c)(1),  
(2) Date: May 13, 2016

(87) PCT Pub. No.: WO2015/073327  
PCT Pub. Date: May 21, 2015

(65) Prior Publication Data  
US 2016/0258558 A1    Sep. 8, 2016

Related U.S. Application Data

(60) Provisional application No. 61/904,674, filed on Nov. 15, 2013.

(51) Int. Cl.  
*F16L 9/14* (2006.01)  
*F16L 11/10* (2006.01)  
(Continued)

(52) U.S. Cl.  
CPC ............. *F16L 11/10* (2013.01); *F16L 11/081* (2013.01); *F16L 11/085* (2013.01); *F16L 11/16* (2013.01);  
(Continued)

(58) Field of Classification Search  
CPC ......... F16L 11/085; F16L 11/083; F16L 11/16  
(Continued)

(56) References Cited

U.S. PATENT DOCUMENTS 2,712,841 A * 7/1955 Simmons ................ E01B 31/22  
144/119.1  
4,706,713 A * 11/1987 Sadamitsu ............ B29C 53/583  
138/129  
(Continued)

FOREIGN PATENT DOCUMENTS

EP          1 020 673 A1    7/2000  
WO         00/37841 A1    6/2000

OTHER PUBLICATIONS

Extended European Search Report for corresponding European Patent Application No. 14862638.5 dated May 29, 2017, 8 pages.  
(Continued)

*Primary Examiner* — Patrick F Brinson  
(74) *Attorney, Agent, or Firm* — Merchant & Gould P.C.

(57) ABSTRACT

Manufacturing a collapse resistant hose arrangement includes fabricating a hose around a flexible conduit having a spiral-wound interlock configuration. Fabricating the hose includes extruding a first polymer layer over the flexible conduit; cooling the first polymer layer; extruding a second polymer layer over the first polymer layer after the first polymer layer has cooled to form a core tube around the flexible conduit; and extruding an outer sheath around the core tube. In certain examples, the first polymer layer is sufficiently thin as to not flow into an interfering relationship with the spiral-wound interlock configuration of the flexible conduit during cooling.

20 Claims, 5 Drawing Sheets

(51) Int. Cl.
*F16L 11/08* (2006.01)
*F16L 11/16* (2006.01)
*F16L 33/01* (2006.01)
*F16L 33/207* (2006.01)

(52) U.S. Cl.
CPC ........... *F16L 33/01* (2013.01); *F16L 33/2073* (2013.01); *F16L 33/2076* (2013.01)

(58) Field of Classification Search
USPC ........ 138/137, 121, 122, 123–125, 134, 135
See application file for complete search history.

(56) References Cited

U.S. PATENT DOCUMENTS

| | | | | |
|---|---|---|---|---|
| 4,727,909 | A * | 3/1988 | Griffiths | B29C 53/78 138/125 |
| 5,275,208 | A * | 1/1994 | Lawrence | F16L 11/08 138/109 |
| 5,792,532 | A | 8/1998 | Pfleger et al. | |
| 6,755,217 | B1 * | 6/2004 | Yoshida | F16L 11/112 138/121 |
| 7,069,954 | B2 * | 7/2006 | Takagi | F16L 11/15 138/121 |
| 7,559,341 | B2 * | 7/2009 | Wintrebert | F16L 11/081 138/121 |
| 7,987,875 | B2 * | 8/2011 | Rytter | F16L 11/083 138/125 |
| 2004/0094953 | A1 | 5/2004 | Luft et al. | |
| 2006/0125233 | A1 | 6/2006 | Cantrell et al. | |
| 2006/0144456 | A1 * | 7/2006 | Donnison | F16L 9/147 138/121 |
| 2008/0053553 | A1 | 3/2008 | Doshi et al. | |
| 2008/0143105 | A1 | 6/2008 | Carey et al. | |
| 2009/0261580 | A1 | 10/2009 | Zakrzewski et al. | |
| 2010/0187815 | A1 | 7/2010 | Theberath et al. | |

OTHER PUBLICATIONS

International Search Report for corresponding International Patent Application No. PCT/US2014/064640 dated Mar. 15, 2015.
"Synflex® Subsea Hose Solutions", Eaton Corporation, 4 pgs (2007).
"Synflex® HCR Collapse Proof Hose", Eaton Corporation, 2 pgs (2011).

* cited by examiner

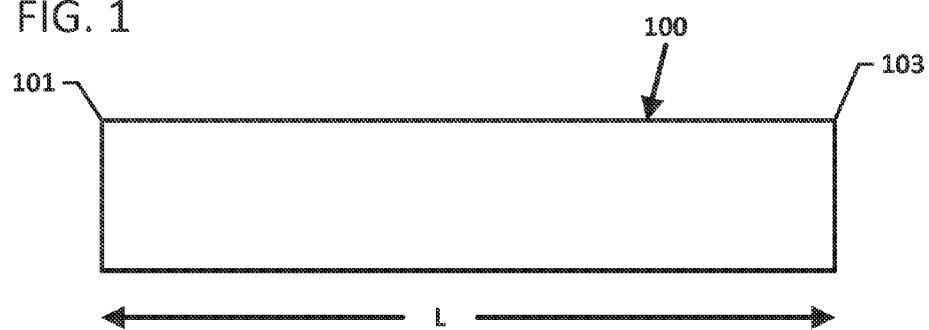
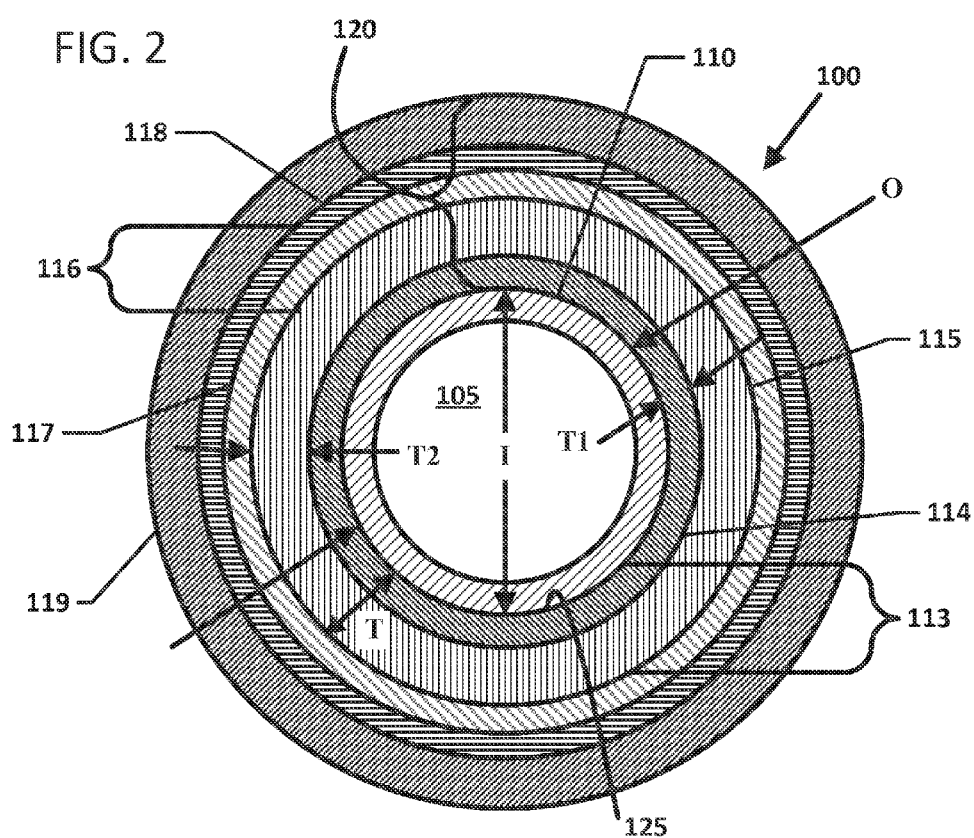

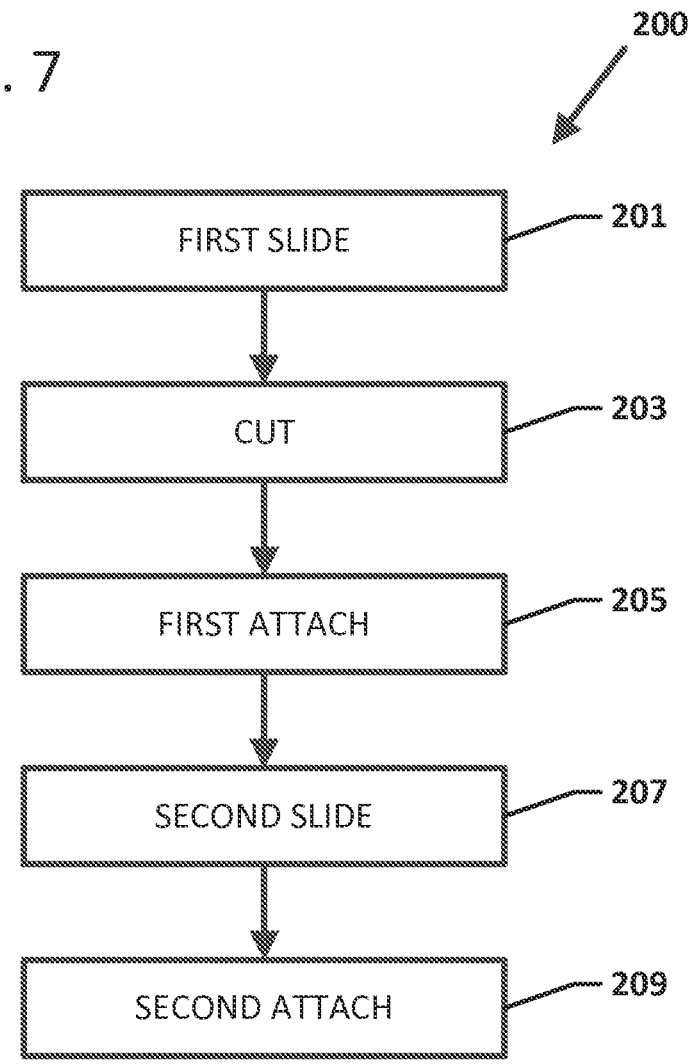

COLLAPSE RESISTANT HOSE AND THE MANUFACTURE OF THE SAME

CROSS-REFERENCE TO RELATED APPLICATION(S)

This application is a National Stage Application of PCT/US2014/064640, filed on Nov. 7, 2014, which claims priority to U.S. patent application Ser. No. 61/904,674 filed on Nov. 15, 2013, the disclosure of which is incorporated herein by reference in its entirety. To the extent appropriate, a claim of priority is made to each of the above disclosed applications.

BACKGROUND

Collapse resistant hoses are used to transport fluid media in high pressure environments, such as sub-marine applications. Fabricating a collapse resistant hose includes extruding a single solid polymer layer over a flexible conduit to form an internal assembly. The conduit has significant circumferential strength in order to resist crushing and collapsing. The polymer layer forms a core tube that contains the fluid media. A sheath can be extruded over the internal assembly to protect the core tube. In certain types of hoses, a reinforcing layer (e.g., of braided or spiraled fiber) can be added between the sheath and the internal assembly to resist internal fluid pressure of the fluid media carried through the internal assembly.

The core tube can engage the conduit in an interfering relationship when extruded over the conduit. For example, during fabrication of the core tube, portions of the extruded core tube can shrink or flow into spiral grooves or other structures defined by the flexible conduit. These portions of the core tube can engage with the conduit in such a way as to interfere with the ability to axially move the core tube relative to the conduit.

Improved collapse resistant hoses are desirable.

SUMMARY

An aspect of the present disclosure relates to a method of manufacturing a collapse resistant hose arrangement including fabricating a hose around a flexible conduit having an outer surface textured or structured so that the outer surface is not smooth. The hose is fabricated to extend over the flexible conduit without interlocking with or otherwise engaging the outer surface in such a way as to inhibit axial movement of the hose relative to the flexible conduit.

In an example, the flexible conduit has a spiral-wound interlock configuration that results in grooves being defined in the outer surface of the flexible conduit. in such an example, the hose is fabricated so that an interior surface of the hose remains clear of the grooves so that axial movement of the hose relative to the flexible conduit is not inhibited.

Fabricating the hose includes extruding a first polymer layer over the flexible conduit; cooling the first polymer layer; and extruding a second polymer layer over the first polymer layer after the first polymer layer has cooled to form a core tube around the flexible conduit. The first polymer layer is sufficiently thin as to not flow into an interfering relationship with the outer surface of the flexible conduit during cooling of the first polymer layer.

In certain examples, fabricating the hose also includes extruding an outer sheath around the core tube. In certain examples, fabricating the hose also includes disposing a reinforcing arrangement around the core tube. In an example, the reinforcing arrangement is disposed between the core tube and the outer sheath. In certain examples, the reinforcing arrangement includes one or more layers of braided or spiraled reinforcing fibers (e.g., aramid yarn).

Another aspect of the present disclosure relates to a collapse resistant hose arrangement including a flexible conduit having a textured or structured surface that is not smooth; and a core tube disposed around the flexible conduit. The core tube is structured and configured so that the flexible conduit does not catch or otherwise interfere with axial movement of the core tube relative to the flexible conduit. In certain implementations, an outer sheath is disposed about the core tube.

In an example, the flexible conduit has a spiral-wound interlock configuration resulting in a spiral groove extending around the outer surface of the flexible conduit. In such an example, the core tube may have a smooth inner surface. In another such example, the inner diameter of the core tube may remain larger than a maximum outer diameter of the flexible conduit.

In some implementations, the core tube includes an inner polymer layer and an outer polymer layer. The inner polymer layer is thinner than the outer polymer layer. In an example, the thickness of the inner polymer layer is no more than about 0.05 inches.

In certain implementations, the first polymer layer includes a first material and the second polymer layer includes a different second material. In other implementations, the first and second polymer layers are formed from the same material.

In some implementations, the first polymer layer is formed from a composition that includes at least a polyamide, In certain examples, the first polymer layer includes a nylon, such as Nylon 11 or Nylon 12. In certain examples, the first polymer layer includes Polyvinylidene fluoride (PVDF). In certain examples, the first polymer layer includes Copolyester. In certain examples, the first polymer layer includes Polyethylene (PE). In certain examples, the first polymer layer includes Polytetrafluoroethylene (PTFE).

In certain implementations, a reinforcing arrangement is disposed around the core tube. The reinforcing arrangement has sufficient strength to withstand fluid pressure of fluid passing through the core tube. In an example, the reinforcing arrangement includes a braided layer of reinforcing fiber (e.g., aramid yarn). In another example, the reinforcing arrangement includes multiple braided layers of reinforcing fiber. In other examples, the reinforcing arrangement can include spirally wound reinforcing fibers.

Another aspect of the present disclosure relates to a collapse resistant hose arrangement including a flexible conduit having a spiral-wound interlock configuration; a core tube disposed around the flexible conduit; and an outer sheath disposed about the core tube. The core tube includes a first polymer layer and a second polymer layer. The first polymer layer has a thickness that is about 10-40% of a total thickness of the core tube.

In certain examples, the thickness of the first polymer layer is about 10-20% of the total thickness of the core tube. In other examples, the thickness of the first polymer layer is about 20-30% of the total thickness of the core tube, In other examples, the thickness of the first polymer layer is about 30-40% of the total thickness of the core tube. In other examples, the thickness of the first polymer layer is about 15-25% of the total thickness of the core tube. In other examples, the thickness of the first polymer layer is about 25-35% of the total thickness of the core tube.

Another aspect of the present disclosure relates to a method of installing a collapse resistant hose arrangement including a flexible conduit and a hose disposed around the flexible conduit. The method includes axially sliding the hose in a first direction relative to the flexible conduit to expose an axial end of the flexible conduit; attaching the axial end of the flexible conduit to a fitting; axially sliding the hose in an opposite second direction relative to the flexible conduit; and attaching the hose to the fitting. The hose defines an inner surface that is sized and shaped to not interfere with grooves defined by an exterior of the flexible conduit during axial sliding of the house relative to the flexible conduit.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 1 is a side view of an example collapse resistant hose configured in accordance with the principles of the present disclosure;

FIG. 2. is a transverse cross-sectional view of the collapse resistant hose of FIG. 1;

FIG. 7 illustrates an installation process by which the hose arrangement of FIG. 5 can be installed at the fitting of FIG. 5.

DETAILED DESCRIPTION

Figure 3:
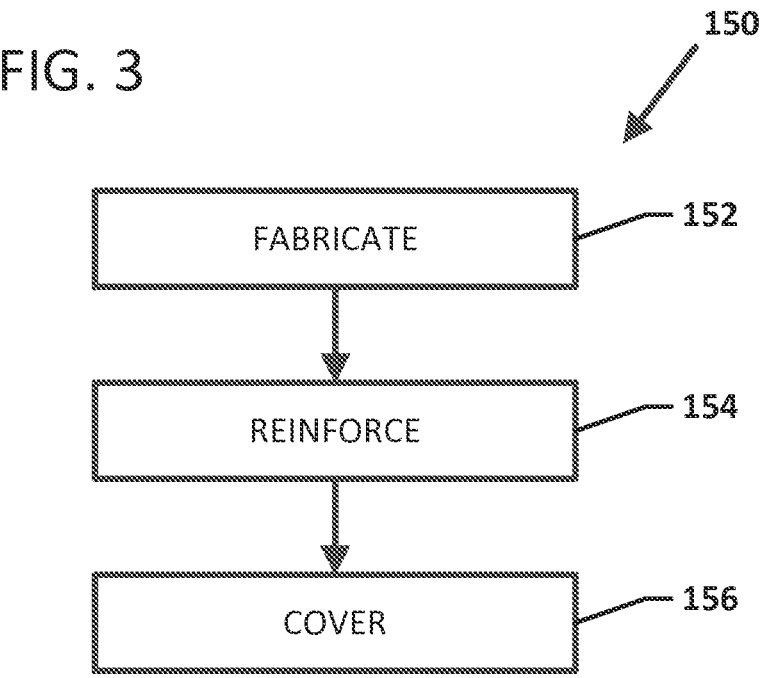
FIG. 3 illustrates one example manufacturing process for fabricating the hose arrangement.

Reference will now be made in detail to exemplary aspects of the present disclosure that are illustrated in the accompanying drawings. Wherever possible, the same reference numbers will be used throughout the drawings to refer to the same or like parts.

This disclosure relates to a collapse resistant hose arrangement including a flexible conduit having a textured or structured surface; and a core tube disposed around the flexible conduit. The core tube is structured and configured so that the flexible conduit does not catch or otherwise interfere with axial movement of the core tube relative to the flexible conduit.

In an example, the core tube may have a smooth inner surface, In another example, the inner diameter of the core tube may remain larger than a maximum outer diameter of the flexible conduit.

In an example, the flexible conduit has a spiral-wound interlock configuration resulting in a spiral groove extending around the outer surface of the flexible conduit. In another example, the flexible conduit has a corrugated conduit. In an example, the flexible conduit is formed of metal.

The hose is fabricated around the flexible conduit to avoid interlocking or otherwise engaging the outer surface of the flexible conduit in such a way as to inhibit axial movement of the hose relative to the flexible conduit. For example, the hose can be fabricated so that an interior surface of the hose remains sufficiently clear of structure or texture on the outer surface of the flexible conduit that axial movement of the hose relative to the flexible conduit is not inhibited.

FIGS. 1 and 2 illustrate an example collapse resistant hose arrangement 100 extending along a length L from a first end 101 to a second end 103, The hose arrangement 100 defines an inner passage 105 through which a fluid media can flow. The hose arrangement 100 includes a flexible conduit 110 defining the inner passage 105 and a hose 120 disposed about the flexible conduit 110. The hose 120 defines an inner surface 125 that is sized and shaped to not engage an exterior surface 111 (FIG. 6) of the flexible conduit 110 in an interfering relationship. The flexible conduit 110 has an outer diameter O; the hose 120 has an inner diameter I.

The flexible conduit 110 provides sufficient rigidity to the hose 120 to inhibit collapse of the hose 120. The flexible conduit 110 is sufficiently strong to withstand external pressures applied to the hose 120, such as external pressures associated with subsea applications. In certain implementations, the flexible conduit 110 has a structured or textured outer surface that is not smooth. As the term is used herein, a structured outer surface refers to the outer surface formed when structures of different shapes and/or sizes are coupled together. As the term is used herein, a textured outer surface refers to a non-smooth outer surface of a unitary structure.

For example, the flexible conduit 110 can be formed from a spiral wound interlocked conduit. The interlock of the spiral windings creates a non-smooth, structured outer surface. In other implementations, the flexible conduit 110 is otherwise formed to enable flexing along the length L while retaining tensile strength. In an example, the flexible conduit 110 is formed from stainless steel. In other implementations, the flexible conduit 110 can be formed from other materials having sufficient strength and rigidity to withstand external pressures applied to the hose arrangement 100 (e.g., by the surrounding environment).

The hose 120 includes a core tube 113 surrounding the flexible conduit 110 and an outer sheath 119 surrounding the core tube 113. In certain implementations, the hose arrangement 100 also can include a reinforcing arrangement 116 disposed between the core tube 113 and the sheath 119. The optional reinforcing arrangement 116 is sufficiently strong to withstand internal pressure exerted by the fluid media flowing through the passage 105. For example, the reinforcing arrangement 116 can enable the core tube 113 to withstand internal pressure of up to about 15,000 psi.

In certain implementations, the reinforcing arrangement 116 includes a first layer 117 of reinforcing fibers. In an example, the reinforcing fibers are wrapped in a spiral configuration around the core tube 113. In another example, the reinforcing fibers are braided around the core tube 113. In other implementations, the reinforcing arrangement 116 includes a first layer 117 and a second layer 118 of reinforcing fibers (e.g., spiraled, braided, etc.).

The core tube 113 of the hose 120 is structured to not catch on an external surface 111 of the flexible conduit 110 during axial movement of the hose 120 relative to flexible conduit 110, For example, the inner diameter I of the hose 120 can be at least as large as the outer diameter O of the flexible conduit along the length L of the hose 100. In one example implementation, the inner diameter I of the hose 120 is generally constant along the length L of the hose arrangement 100.

Figure 6:
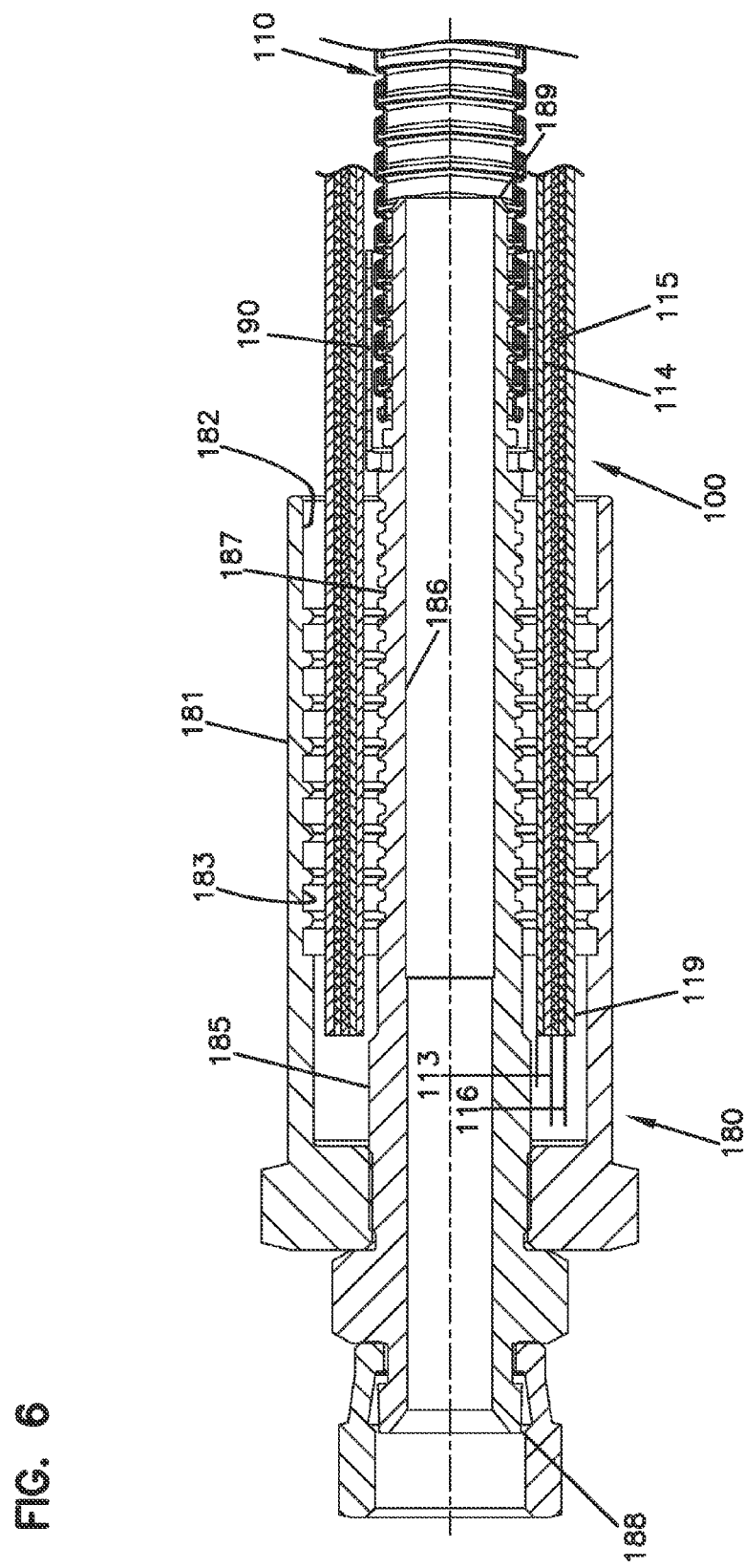
FIG. 6 is a longitudinal cross-section of the hose arrangement and fitting of FIG. 5.

In certain implementations, the exterior surface 111 of the flexible conduit 110 defines grooves 112 (see FIG. 6). The hose 120 is configured to mitigate how much of the hose 120 extends into the grooves 112 of the flexible conduit 110. For example, in certain implementations, no portion of the core tube 113 extends into any of the grooves 112 of the flexible conduit 110.

In some implementations, the core tube 113 includes one or more layers. In certain implementations, the core tube 113 includes a first layer 114 and a second layer 115 (see FIG. 2). The core tube 113 has a total thickness T; the first layer 114 has a first thickness T1; and the second layer 115 has a second thickness T2. In certain examples, the thickness T1 of the first layer is no more than about 0.05 inches.

In some implementations, the first thickness T1 of the first layer 114 is about 10-40% of the total thickness T of the core tube 113. In certain examples, the first thickness T1 of the first layer 114 is about 10-20% of the total thickness T of the core tube 113. In other examples, the first thickness T1 of the first layer is about 20-30% of the total thickness T of the core tube 113. In other examples, the first thickness T1 of the first layer is about 30-40% of the total thickness T of the core tube 113. In other examples, the first thickness T1 of the first layer is about 25-35% of the total thickness T of the core tube 113. In other examples, the first thickness T1 of the first layer is about 30-35% of the total thickness T of the core tube 113.

In some implementations, each of the layers 114, 115 of the core tube 113 includes a polymer material. In certain implementations, the layers 114, 115 of the core tube 113 include the same polymer material. In other implementations, the layers 114, 115 of the core tube 113 include different polymer materials.

In some implementations, at least one of the layers is formed from a composition that includes at least a polyamide. In certain examples, at least one of the layers includes a nylon, such as Nylon 11 or Nylon 12. In certain examples, at least one of the layers includes Poi vinylidene fluoride (PVIDF). In certain examples, at least one of the layers includes Copolyester. In certain examples, at least one of the layers includes Polyethylene (PE). In certain examples, at least one of the layers includes Polytetrafluoroethylene (PTFE).

FIG. 3 illustrates one example manufacturing process 150 for fabricating the hose arrangement 100. The manufacturing process 150 includes a fabrication step 152 during which the core tube 113 is disposed over the flexible conduit 110. In some implementations, the core tube 113 is extruded over the flexible conduit 110 during the fabrication step 152. The core tube 113 is extruded in such a way that the core tube 113 does not bond to or form internal structure that engages with an external surface 111 of the flexible conduit 110.

An optional reinforce step 154 adds a reinforcing arrangement 116 around the core tube 113. In some implementations, the reinforce step 154 includes wrapping a layer 117 of reinforcing fibers (e.g., aramid yarns) around the core tube 113 in a spiral configuration. In other implementations, the reinforce step 154 includes wrapping a layer 117 of reinforcing fibers (e.g., aramid yarns) around core tube 113 in a braided configuration. In certain implementations, the reinforce step 154 includes wrapping a second layer 118 of reinforcing fibers (e.g., aramid yarns) around the first layer 117 (e.g., in a spiral configuration, in a braided configuration, etc.).

An optional cover step 156 extrudes an outer sheath 119 around at least the core tube 113. In certain implementations, the cover step 156 extrudes the outer sheath 119 around the reinforcing arrangement 116. In an example, the outer sheath 119 is formed from plastic.

Figure 4:
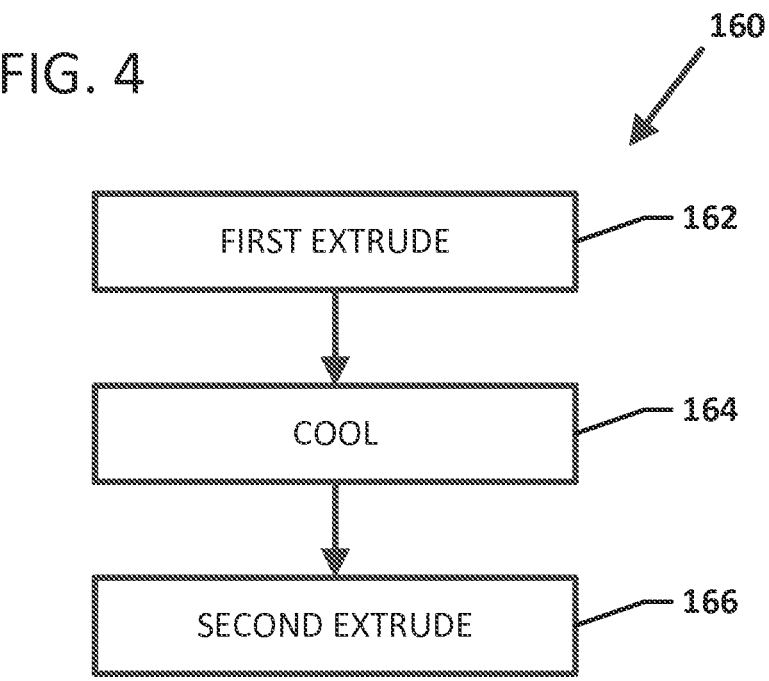
FIG. 4 illustrates an example fabrication process by which the fabrication step of FIG. 3 can be implemented to form the core tube.

FIG. 4 illustrates an example fabrication process 160 by which the fabrication step 152 of FIG. 3 can be implemented to form the core tube 113. The fabrication process 160 includes a first extrusion step 162 during which a first layer 114 of the core tube 113 is extruded over the flexible conduit 110. A cooling step 164 allows the first extruded layer 114 to cool around the flexible conduit 110. A second extrusion step 166 includes extruding a second layer 115 of the core tube 113 about the cooled first layer 114 of the core tube 113.

Depending on the material being extruded, in certain implementations, the second layer 115 is at least partially bonded to the first layer 114. For example, in certain implementations, the at least partial bond between the layers 114, 115 has sufficient shear strength to inhibit axial sliding of one layer 114, 115 relative to the other layer 114, 115. In certain implementations, the second layer 115 is less than fully bonded to the first layer 114. For example, in certain implementations, a seam is visible between the two layers 114, 115 when viewed at one end of the core tube 113. In certain examples, the second layer 115 is radially separable from the first layer 114. In certain examples, the at least partial bond between the layers 114, 115 has sufficient shear strength to inhibit axial sliding, but does not have sufficient tension strength to inhibit peeling the second layer 115 from the first layer 114 if the core tube 113 is axially sliced.

The first extrusion step 162 extrudes the first layer 114 of the core tube 113 so that the first layer 114 does not enter into an interfering relationship with an external surface 111 of the flexible conduit 110. In some implementations, the first extrusion step 162 extrudes a sufficiently thin first layer 114 so that an inner molten surface of the first layer 114 does not flow into grooves 112 defined by the flexible conduit outer surface 111 during the first extrusion step 162 or during the cooling step 164. In an example, the first extrusion step 162 extrudes the first layer 114 with a first thickness T1 of no more than about 0.05 inches.

The second extrusion step 166 extrudes the second layer 115 of the core tube 113 to be thicker than the first layer 114. In some implementations, the second layer 115 can be extruded to have a second thickness T2 of about 60-90% of the total thickness T of the core tube 113. In certain implementations, the second layer 115 is at least twice the thickness of the first layer 114. In certain examples, the second layer 115 is at least three times the thickness of the first layer 114. In an example, the second layer 115 is at least four times the thickness of the first layer 114.

Figure 5:
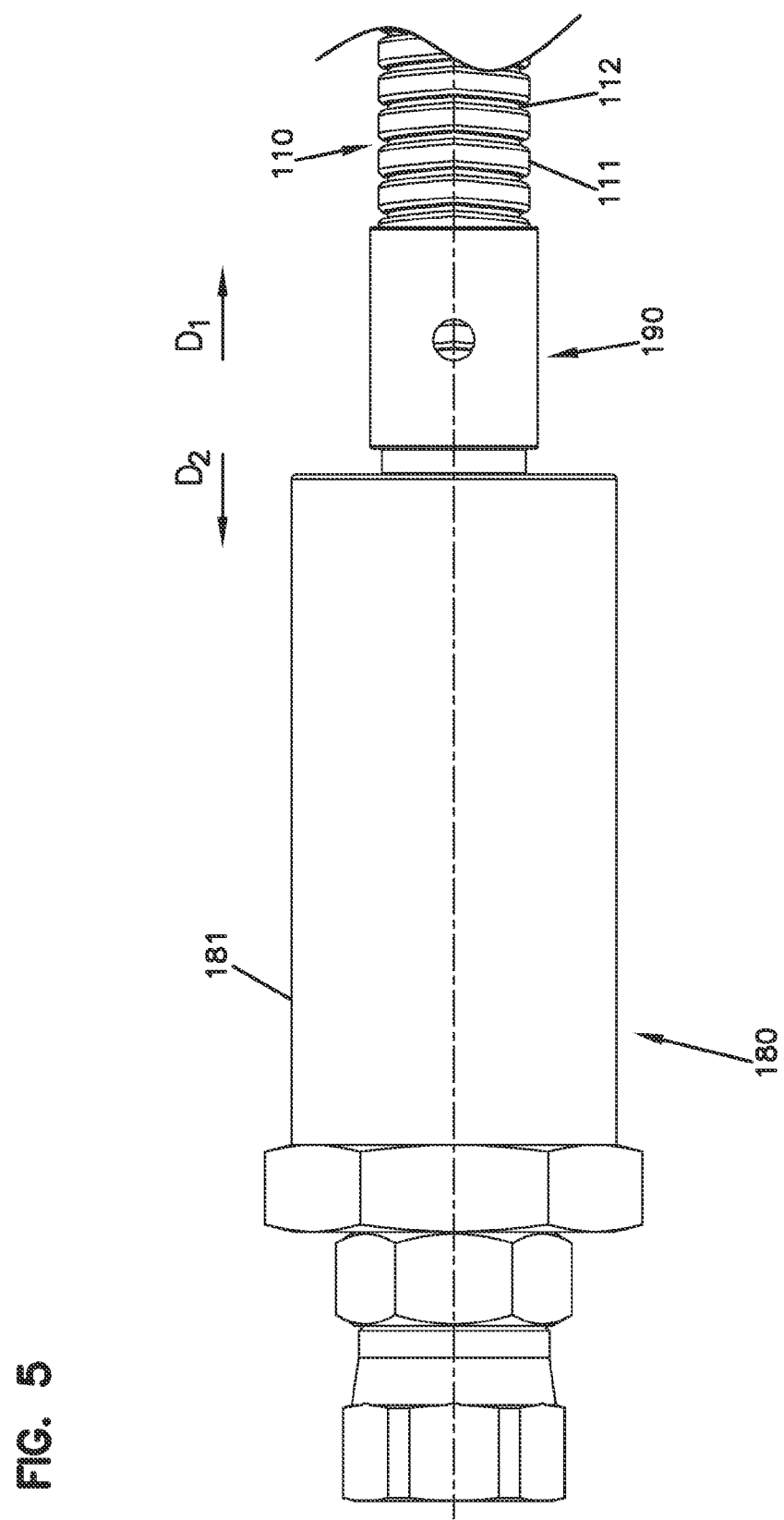
FIG. 5 is a side view of an example hose arrangement coupled to an example fitting.

FIGS. 5 and 6 illustrate an example hose arrangement 100 installed at a fitting 180. The fitting 180 extends from a first end 188 to a second end 189. The fitting 180 includes an outer portion 181 that defines an open interior 182. An internal portion 185 of the fitting 180 extends through the open interior 182 of the outer portion 181. The internal portion 185 defines an open interior 186. In certain implementations, an inner surface 183 of the outer portion 181 defines a structured or patterned surface. In certain implementations, an outer surface 187 of the internal portion 185 defines a structured or patterned surface.

One end 101, 103 of the hose arrangement 100 is coupled to the fitting 180. An axial end of the flexible conduit 110 is coupled to an internal portion 185 of the fitting 180. The hose 120 extends past the axial end of the conduit 110. over part of the internal portion 185 of the fitting 180, and within the external portion 181 of the fitting 180, The hose 120 is coupled to the external portion 181 of the fitting 180. in certain implementations, the hose 120 is coupled between the external portion 181 and the internal portion 185.

FIG. 7 illustrates installation process 200 by which the hose arrangement 100 can be installed at the fitting 180. In a first slide step 201, the hose 120 is slid axially in a first direction D1 relative to the flexible conduit 110. The inner surface 125 of the hose 120 is sized and shaped to facilitate sliding of the hose 120 relative to the conduit 110. Sliding the hose 120 in the first direction D1 exposes an axial end of the flexible conduit 110.

The axial end of the flexible conduit 110 is trimmed in a cut step 203 to form a new axial end. A sufficient amount of the flexible conduit 110 is trimmed to facilitate attaching the flexible conduit 110 to the internal portion 185 of the fitting 180. In sonic implementations, the trimmed portion of the axial end is at least one inch long. In certain implementations, the trimmed portion of the axial end is at least two inches long.

The new axial end of the flexible conduit 110 is coupled to the internal portion 185 of the fitting 180 in a first attach step 205. In certain implementations, the internal portion 185 of the fitting 180 is partially inserted into the new axial end of the flexible conduit 110. In an example, an interior surface of the flexible conduit fits with the structured exterior surface 187 of the internal portion 185 of the fitting 180. In some implementations, the new axial end of the flexible conduit 110 is crimped to the internal portion 185 of the fitting 180. For example, a crimp ring 190 is shown disposed over the flexible conduit 110 and the internal portion 185 in FIG. 6. In other implementations, the new axial end of the flexible conduit 110 is swaged to the internal portion 185 of the fitting 180.

In a second slide step 207, the hose 120 is slid axially in a second direction D2 relative to the flexible conduit 110. The second direction D2 is opposite the first direction D1. The inner surface 125 of the hose 120 is sized and shaped to facilitate sliding of the hose 120 relative to the conduit 110. Sliding the hose 120 in the second direction D2 covers the new axial end of the flexible conduit 110.

In some implementations, the hose 120 is slid past the new axial end of the flexible conduit 110 and over part of the internal portion 185 of the fitting 180. In certain implementations, the hose 120 is slid into the open interior 182 of the external portion 181 of the fitting 180. In certain implementations, the hose 120 is disposed between the structured external surface 187 of the internal portion 185 and the structured inner surface 183 of the external portion 181 (see FIG. 6). In certain implementations, the external portion 181 of the fitting 180 can be crimped or otherwise attached to the hose 120 (e.g., to the outer sheath 119).

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A collapse resistant hose arrangement comprising:
   a flexible conduit having a structured or textured outer surface; and
   a core tube disposed around the flexible conduit, the core tube including a first polymer layer and a second polymer layer, the first polymer layer having a thickness that is about 10-40% of a total thickness of the core tube; and
   a reinforcing arrangement disposed about the core tube, wherein the reinforcing arrangement includes a first layer of reinforcing fibers.

2. The collapse resistant hose of claim 1, further comprising an outer sheath disposed about the reinforcing arrangement.

3. The collapse resistant hose of claim 1, wherein the reinforcing arrangement also includes a second layer of reinforcing fibers disposed about the first layer of reinforcing fibers.

4. The collapse resistant hose of claim 1, wherein the flexible conduit has a spiral-wound interlock configuration resulting in grooves being defined in the outer surface.

5. The collapse resistant hose of claim 1, wherein the first polymer layer includes a first material and the second polymer layer includes a different second material.

6. The collapse resistant hose of claim 1, wherein the first and second polymer layers are formed from the same material.

7. The collapse resistant hose of claims 1, wherein the first polymer layer includes PVDF.

8. The collapse resistant hose of claim 1, wherein the thickness of the first polymer layer is about 30-40% of the total thickness of the core tube.

9. The collapse resistant hose of claims 8, wherein the thickness of the first polymer layer is about 30-35% of the total thickness of the core tube.

10. The collapse resistant hose of claim 8, wherein the thickness of the first polymer layer is about 35-40% of the total thickness of the core tube.

11. The collapse resistant hose of claim 1, wherein the thickness of the first polymer layer is no more than about 0.05 inches.

12. A collapse resistant hose arrangement comprising:
    a flexible conduit having a structured or textured outer surface;
    a core tube disposed around the flexible conduit and structured so that the core tube does not catch on the outer surface of the flexible conduit during axial movement of the core tube relative to the flexible conduit, the core tube having a first layer and a second layer, each of the first and second layers being formed of the same material, wherein an inner surface of the second layer directly contacts an outer surface of the first layer;
    reinforcing arrangement disposed around the core tube, the reinforcing arrangement including at least one layer of reinforcing fibers; and
    an outer sheath disposed about the reinforcing arrangement.

13. The collapse resistant hose of claim 12, wherein the flexible conduit has a spiral-wound interlock configuration resulting in grooves being defined in the outer surface.

14. The collapse resistant hose of claim 1, wherein the flexible conduit has a corrugated configuration.

15. The collapse resistant hose of claim 12, wherein the first and second layers are polymer layers.

16. The collapse resistant hose of claim 12, wherein the first layer having a thickness that is about 10-40% of a total thickness of the core tube.

17. The collapse resistant hose of claim 12, wherein the reinforcing arrangement also includes a second layer of reinforcing fibers disposed about the first layer of reinforcing fibers.

18. The collapse resistant hose of claim 12, wherein the core tube has a smooth inner surface.

19. The collapse resistant hose of claim 12, wherein an inner diameter of the core tube is larger than a maximum outer diameter of the flexible conduit.

20. The collapse resistant hose of claim 12, wherein the at least one layer of reinforcing fibers includes a braided layer of aramid yarn.

* * * * *